(12) United States Patent
Kurisu et al.

(10) Patent No.: US 11,431,913 B2
(45) Date of Patent: Aug. 30, 2022

(54) FOCUS DETECTION APPARATUS, AND FOCUS DETECTION METHOD WHICH PERFORMS BLINKING DETECTION

(71) Applicant: CANON KABUSHIKI KAISHA, Tokyo (JP)

(72) Inventors: Hiroaki Kurisu, Inagi (JP); Naoki Iwasaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/829,980

(22) Filed: Mar. 25, 2020

(65) Prior Publication Data

US 2020/0314315 A1 Oct. 1, 2020

(30) Foreign Application Priority Data

Mar. 29, 2019 (JP) .............................. JP2019-068847

(51) Int. Cl.
*H04N 5/235* (2006.01)
(52) U.S. Cl.
CPC ................................ *H04N 5/2351* (2013.01)
(58) Field of Classification Search
CPC ........................ H04N 5/2351; H04N 5/232123
See application file for complete search history.

(56) References Cited

U.S. PATENT DOCUMENTS

| | | | | |
|---|---|---|---|---|
| 8,842,195 B2 * | 9/2014 | Katagawa | .............. | H04N 5/243 348/226.1 |
| 2003/0112343 A1 * | 6/2003 | Katoh | .................... | H04N 5/235 348/226.1 |
| 2005/0140815 A1 * | 6/2005 | Nakano | .................. | G03B 13/36 348/345 |
| 2007/0013785 A1 * | 1/2007 | Kinoshita | ............ | H04N 5/2357 348/222.1 |
| 2008/0239136 A1 * | 10/2008 | Kanai | .............. | H04N 5/232123 348/340 |
| 2008/0303925 A1 * | 12/2008 | Oota | ................ | H04N 5/232123 348/234 |
| 2015/0163395 A1 * | 6/2015 | Konishi | ............... | H04N 5/2357 348/230.1 |
| 2015/0281547 A1 * | 10/2015 | Terasawa | ............. | H04N 5/2357 348/226.1 |

FOREIGN PATENT DOCUMENTS

| | | |
|---|---|---|
| JP | 2007-212723 A | 8/2007 |
| JP | 2012-160785 A | 8/2012 |

* cited by examiner

*Primary Examiner* — Luong T Nguyen
(74) *Attorney, Agent, or Firm* — Canon U.S.A., Inc. IP Division

(57) ABSTRACT

An apparatus that moves a focus lens, performs a scan operation of sequentially acquiring a focus signal, acquires a focus position of the focus lens based on the focus signal, and includes: a determination unit configured to determine whether an object is blinking at a predetermined period, and a processing unit configured to perform a filtering process in a time axis direction on the acquired focus signal where the object is blinking at the predetermined period.

24 Claims, 9 Drawing Sheets

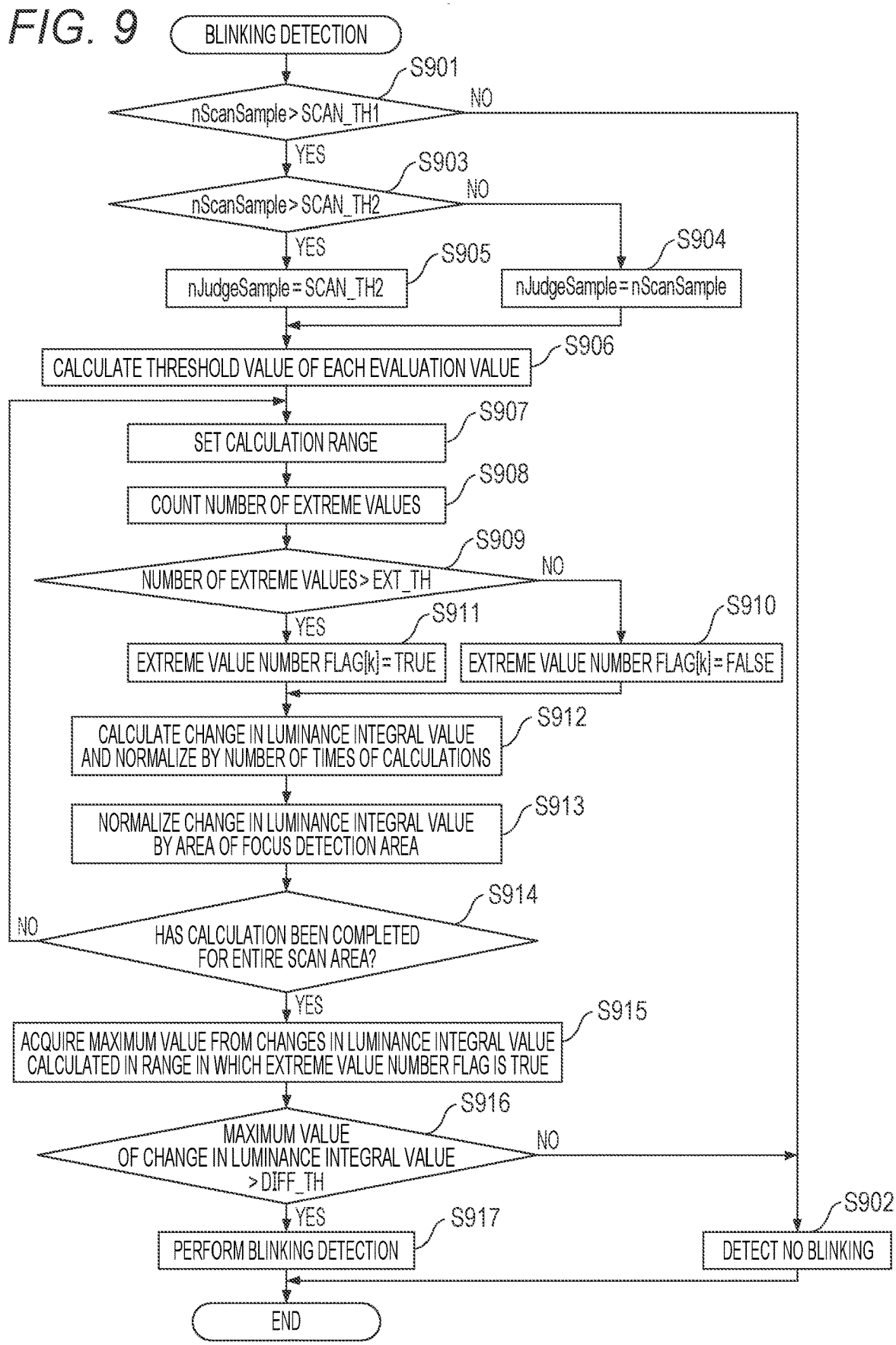

FOCUS DETECTION APPARATUS, AND FOCUS DETECTION METHOD WHICH PERFORMS BLINKING DETECTION

BACKGROUND OF THE INVENTION

Field of the Invention

The aspect of the embodiments relates to a focus detection apparatus that detects a focus state.

Description of the Related Art

Conventionally, in an imaging apparatus such as an electronic still camera, automatic focus control (AF control) has been used as a method of moving a focus lens position to focus on an object. In the AF control, for example, in a case where the contrast of the object is used, a contrast evaluation value indicating a contrast state (sharpness) of the object indicating a degree of in-focus is calculated while the focus lens position is moved. Then, a focus lens is moved to a position where the contrast evaluation value becomes maximum (contrast AF control).

Incidentally, there is conventionally an issue in the contrast AF control in that a blinking object is focused or not in focus at a position where the blinking object is blurring. The cause is that the contrast evaluation value used in the contrast AF control is influenced by the brightness of the object. In the case of an object having a luminance change, a contrast evaluation value varies in accordance with a blinking period, and a large number of false mountain-shaped curves occur. For this reason, it is difficult to catch a contrast peak that is originally desired to be detected.

To solve this issue, in Japanese Patent Laid-Open No. 2007-212723, an object is prevented from being largely blurred by performing a process to move the focus lens to a fixed point when blinking is detected. Additionally, in Japanese Patent Laid-Open No. 2012-160785, the influence of variations in luminance is suppressed by capturing an image at a shutter speed that is a positive multiple of the period of a luminance change in a light source so as to reduce the influence of blinking.

However, it is considered that in the above-described Japanese Patent Laid-Open No. 2007-212723, focusing is not necessarily performed on the basis of object information, and thus it is difficult to highly accurately perform focusing. Additionally, in Japanese Patent Laid-Open No. 2012-160785, if exposure time is extended, AF accuracy may be reduced due to the influence of an object blur or the like.

SUMMARY OF THE INVENTION

An apparatus that moves a focus lens, performs a scan operation of sequentially acquiring a focus signal, acquires a focus position of the focus lens based on the focus signal, and includes:

a memory device that stores a set of instructions; and at least one processor that executes the set of instructions to function as:

a determination unit configured to determine whether an object is blinking at a predetermined period, and a processing unit configured to perform a filtering process in a time axis direction on the acquired focus signal in a case where the object is blinking at the predetermined period.

An apparatus that moves a focus lens, performs a scan operation of sequentially acquiring a focus signal, acquires a focus position of the focus lens based on the focus signal, and includes:

a memory device that stores a set of instructions; and at least one processor that executes the set of instructions to function as:

a determination unit configured to determine whether an object is blinking at a predetermined period;

a detection unit configured to detect a peak of the acquired focus signal;

a determination unit configured to determine reliability based on a level of the peak and a slope of the peak, wherein in a case where the reliability of the detected peak is lower than a predetermined value, a scan interval in a case where the object is blinking at the predetermined period is widened as compared with a case where the object is not blinking at the predetermined period, and a re-scan operation is performed.

A method of moving a focus lens, performing a scan operation of sequentially acquiring a focus signal, and acquiring a focus position of the focus lens based on the focus signal, includes:

determining whether an object is blinking at a predetermined period; and performing a filtering process in a time axis direction for the acquired focus signal in a case where the object is blinking at the predetermined period.

A method of moving a focus lens, performing a scan operation of sequentially acquiring a focus signal, and acquiring a focus position of the focus lens based on the focus signal, includes:

determining whether an object is blinking at a predetermined period;

detecting a peak of the acquired focus signal; and determining reliability based on a level of the peak and a slope of the peak, wherein in a case where the reliability of the detected peak is lower than a predetermined value, a scan interval in a case where the object is blinking at the predetermined period is widened as compared with a case where the object is not blinking at the predetermined period, and a re-scan operation is performed.

Further features of the disclosure will become apparent from the following description of exemplary embodiments (with reference to the attached drawings).

BRIEF DESCRIPTION OF THE DRAWINGS

FIG. 9 is a flowchart illustrating a processing flow of the blinking detection.

DESCRIPTION OF THE EMBODIMENTS

Hereinafter, preferred embodiments of the disclosure will be described in detail with reference to the accompanying drawings.

Configuration of Imaging Apparatus

Figure 1:
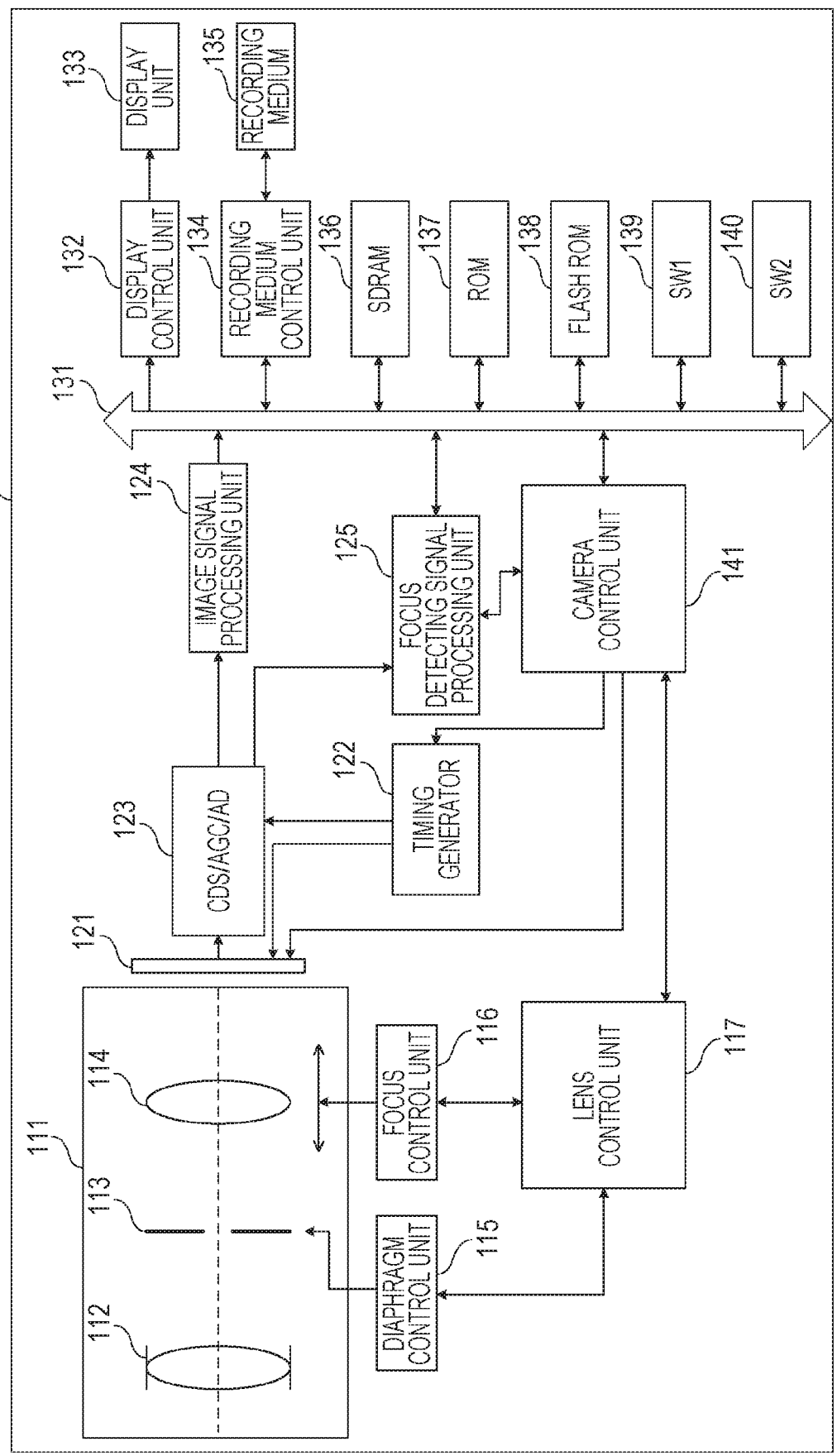
FIG. 1 is an overall block diagram of an imaging apparatus.

FIG. 1 is a block diagram illustrating a configuration of an imaging apparatus 101.

An imaging lens 111 includes a fixed lens 112, a diaphragm 113, and a focus lens 114. A diaphragm control unit 115 adjusts an aperture diameter of the diaphragm 113 by actuating the diaphragm 113 to adjust a light amount during photographing. A focus control unit 116 determines a drive amount for actuating the focus lens 114 of the imaging lens 111. A focus is adjusted by actuating the focus lens 114. By controlling the movement of the focus lens 114 by the focus control unit 116, automatic focusing control is archived. The focus lens 114 is a focus adjusting lens and is simply illustrated as a single lens in FIG. 1, but usually includes a plurality of lenses. The diaphragm control unit 115 and the focus control unit 116 are controlled by a lens control unit 117.

A light beam incident through these optical members (imaging lens 111) forms an image on a light receiving surface of an imaging element 121, and is converted into an electrical signal by the imaging element 121. The imaging element 121 is a photoelectric conversion element that performs photoelectric conversion of an object image (optical image) into signal charges, and includes a charge coupled device (CCD) or a complementary metal oxide semiconductor (CMOS) sensor. The signal charges accumulated in each photoelectric conversion element are sequentially read from the imaging element 121 as a voltage signal corresponding to the signal charge from a driving pulse output from a timing generator 122.

A correlated double sampling (CDS)/automatic gain control (AGC)/analog to digital (AD) converter 123 performs correlated double sampling for removing a reset noise, adjustment of a sensor gain, and digitization of a signal with respect to an image signal and a focus detecting signal read from the imaging element 121. The CDS/AGC/AD converter 123 outputs the image signal to an image signal processing unit 124 and outputs the focus detecting signal to a focus detecting signal processing unit 125. In the present embodiment, an AF evaluation value that is a focus signal is calculated on the basis of the focus detection signal. As the AF evaluation value, a contrast evaluation value indicating the contrast of the object or a luminance integral value acquired by integrating luminance in a frame is calculated. The focus detecting signal processing unit 125 sets and lays out a focus detection area for performing focus detection in an imaging screen. In the present embodiment, the focus detection area is set to have a total of 35 frames in seven rows and five columns, but the number of frames is not limited to this, and may be set to any number.

The image signal processing unit 124 stores the image signal output from the CDS/AGC/AD converter 123 in a synchronous dynamic random-access memory (SDRAM) 136 via a bus 131. The image signal stored in the SDRAM 136 is read by a display control unit 132 via the bus 131 and displayed on a display unit 133. Additionally, in an operation mode for recording an image signal, the image signal stored in the SDRAM 136 is stored in a recording medium 135 by a recording medium control unit 134.

A read-only memory (ROM) 137 stores a control program executed by a camera control unit 141 and various data for control, and a flash ROM 138 stores various setting information related to the operation of the imaging apparatus 101 and the like such as user setting information.

An operation member 139 is a photographing preparation switch (hereinafter, referred to as SW1) for instructing a photographing preparation operation of the AF, automatic exposure (AE), and the like, an operation member 140 is a photographing switch (hereinafter, referred to as SW2) for instructing photographing after operating the SW1. The AE refers to automatic exposure control, and determines a set value of the diaphragm 113, a set value of the accumulation time of the imaging element 121, a set value of the gain of the CDS/AGC/AD123, and a set value of the timing generator 122 on the basis of a magnitude of a pixel signal of an image data temporarily accumulated in the SDRAM 136.

In the camera control unit 141, a focus lens driving amount is transmitted to the lens control unit 117 for focus driving in which the focus lens is moved to detect a focus position and a focus signal is sequentially acquired (hereinafter, referred to as scan operation) or for focus driving until the focus position. After that, a focus lens driving amount is transmitted to the focus control unit 116, thereby archiving automatic focus adjustment.

Operation Flow of Imaging Apparatus

Figure 2:
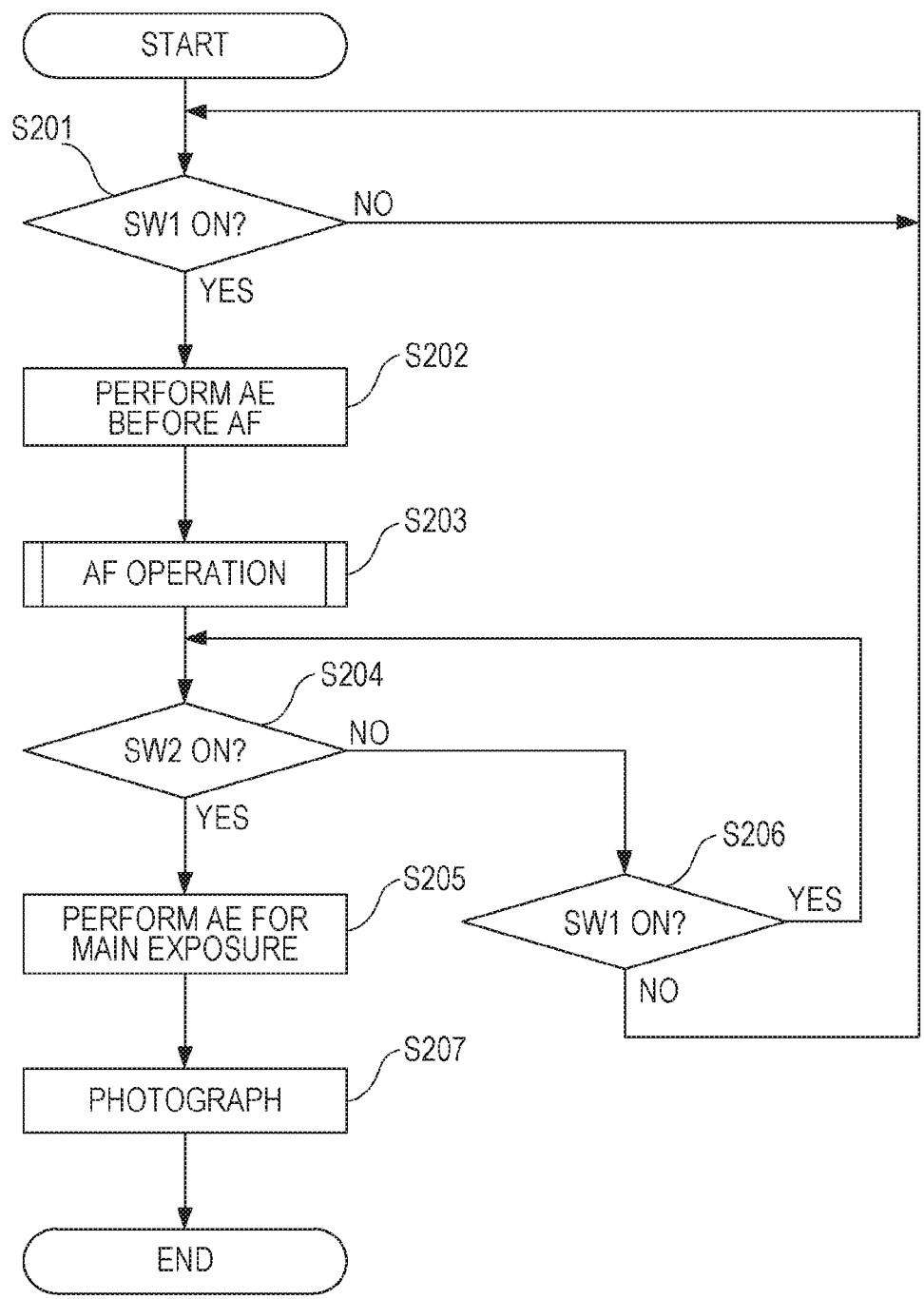
FIG. 2 is a flowchart illustrating an image capturing operation.

FIG. 2 is a flowchart illustrating an operation of the imaging apparatus. First, in S201, it is decided whether the SW1 (139) has been pressed. In a case where the SW1 has been pressed, the process proceeds to S202, where the AE for the AF is performed. In a case where SW1 has not been pressed in S201, the process returns to S201 again. After performing the AE before the AF in S202, the process proceeds to S203 to perform an AF operation. Details of the AF operation will be described later. After the AF operation, it is decided whether the SW2 has been pressed (S204). In a case where it is decided that the SW2 has been pressed, the process proceeds to S205, and the AE for main exposure for a photographed image is performed. In a case where the SW2 has not been pressed in S204, the process proceeds to S206, and it is decided whether the SW1 is kept pressed. In a case where the SW1 has been pressed, the process returns to S204, where it is decided again whether the SW2 has been pressed. In a case where the SW1 has not been pressed in S206, the process returns to S201. When the AE for main exposure ends in S205, a photographing process is performed in S207, and the process ends.

AF Operation Flow

Figure 3:
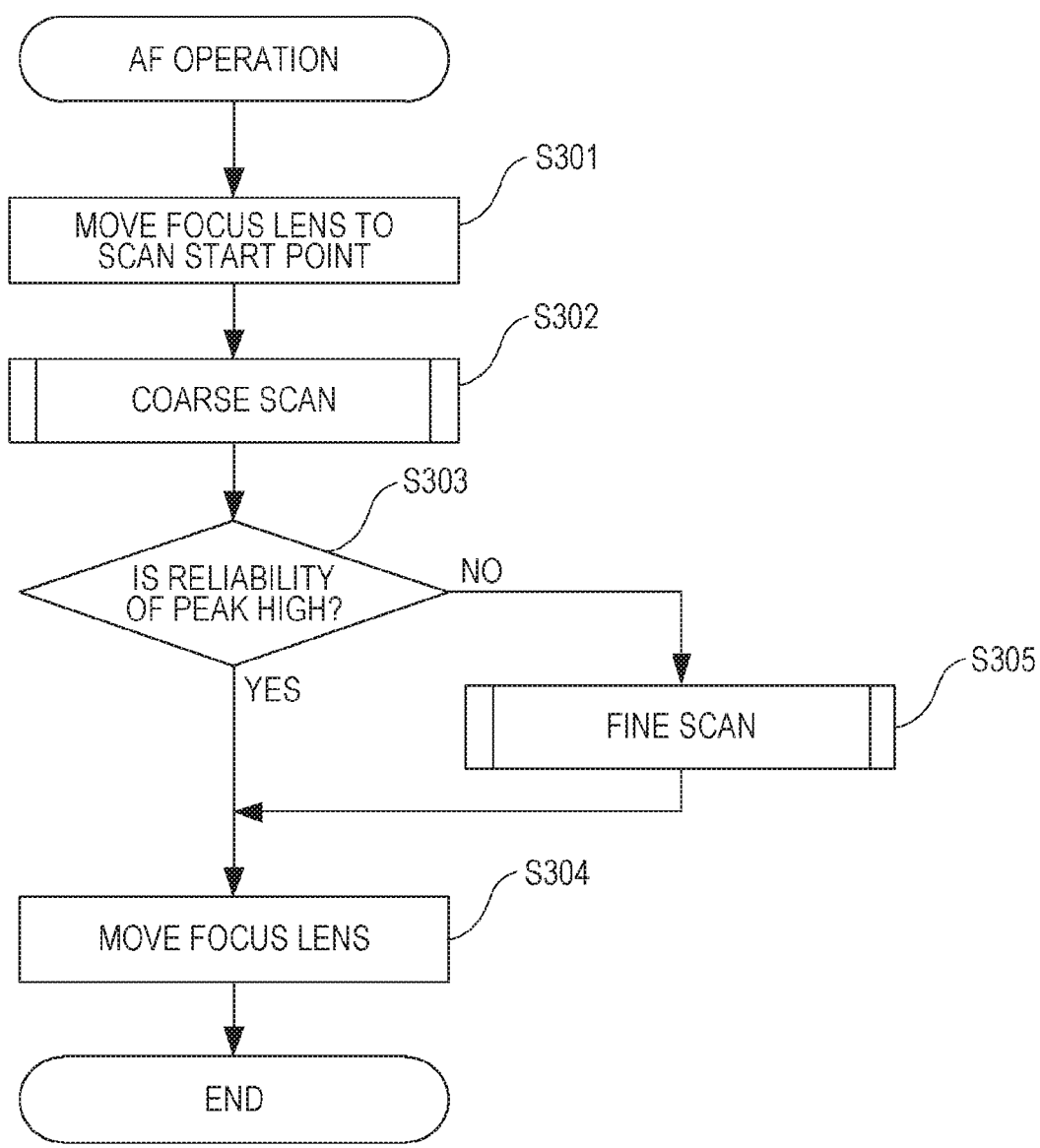
FIG. 3 is a flowchart illustrating an AF operation.

FIG. 3 is a flowchart diagram illustrating the AF operation of S203 in FIG. 2.

First, the process proceeds to S301, where the focus lens position is moved to a scan start point. The scan start point may be the end of the focus lens, and in a case where a relative maximum of the contrast evaluation value is detected by moving at a high speed while acquiring the contrast evaluation value, the scan start point may be a focus lens position that takes the relative maximum.

Next, the process proceeds to S302, where a coarse scan is performed. The coarse scan is one type of scan methods, and is a method of moving the focus lens by a predetermined amount for each frame from the start point described above. Hereinafter, this predetermined amount is referred to as scan interval. The predetermined amount in the present embodiment is set to five times a focal depth, but the scan interval is not limited to the setting in the present embodiment, and may be changed according to a focal length or the focus lens position. In the coarse scan, the focus lens position (peak) at which the contrast evaluation value takes the relative maximum and it is considered to be in focus is calculated. Details of the coarse scan in S302 will be described later.

Next, the process proceeds to S303, where the reliability of the peak calculated in the coarse scan in S302 is determined. In a case where the reliability is higher than a threshold value, the process proceeds to S304, and if the reliability is lower than the threshold value, the process proceeds to S305. Here, the reliability of the peak is calculated according to a shape (steepness or level) of the relative maximum of the contrast evaluation value.

In a case where the process proceeds from S303 to S304, the focus lens is moved to a peak point calculated in S303, and the AF operation ends.

In a case where the process proceeds from S303 to S305, a fine scan is performed in order to increase the accuracy of the peak calculated by the coarse scan. The fine scan is a scan method in which the neighborhood of the peak calculated by the coarse scan is again scanned at fine intervals to further improve focus accuracy. Then, the process proceeds to S304, where the focus lens is actuated according to a result of the fine scan, and the AF operation ends.

Coarse Scan and Fine Scan

Figure 4A:
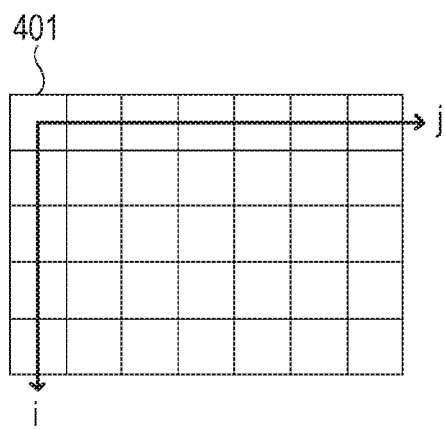
FIGS. 4A to 4D are graphs illustrating a focus detection area and a graph illustrating a scan method.

Next, outlines of the coarse scan and the fine scan will be described with reference to FIGS. 4A to 4D. A specific processing flow will be described later. Reference sign 401 in FIG. 4A represents the focus detection area in the present embodiment. As described above, in the present embodiment, the focus detection area having a total of 35 frames in seven rows and five columns is set. The AF evaluation value is acquired in order from a focus detection area 401. After the AF evaluation value is acquired in a j-axis direction, a move is performed by one frame in an i-axis direction, and the process proceeds again in the j-axis direction to acquire the AF evaluation value.

Figure 4B:
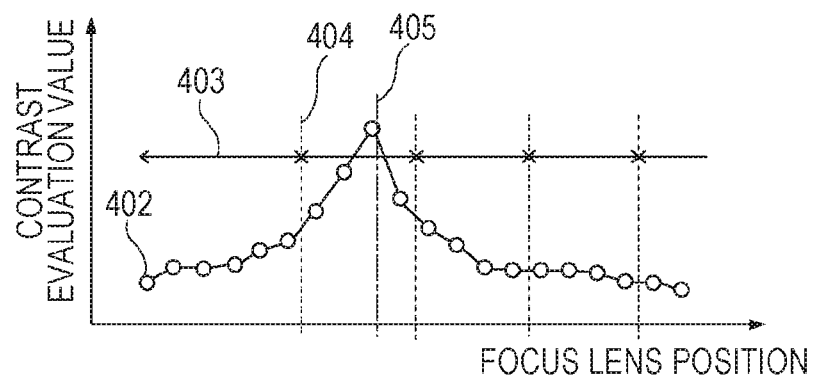

Subsequently, FIG. 4B is a graph illustrating a relationship between a focus lens position and a contrast evaluation value in the case of the coarse scan. A horizontal axis illustrates the focus lens position, and a vertical axis illustrates the contrast evaluation value. A side where a numerical value of the focus lens position is small is the infinite-distance side of the focus lens, and a side where a numerical value of the focus lens position is large is the minimum-object-distance side of the focus lens.

Additionally, reference sign 402 represents a contrast evaluation value at a start point of the coarse scan. In the coarse scan, the focus lens position is divided for each specific moving range 403 (hereinafter, this range is referred to as zone), and in the present embodiment, it is determined whether there is a blinking object when the focus lens reaches a boundary of a zone (404). Note that although FIG. 4B illustrates an example in which there is a plurality of boundaries of zones, the number of boundaries of zones may be one and a movable range of the focus lens may be divided into a macro range and a non-macro range. A peak point calculated on the basis of the contrast evaluation value in FIG. 4B is 405. A peak point 405 is calculated by an interpolation calculation using three or four points in the neighborhood of the relative maximum of the contrast evaluation value.

Figure 4C:
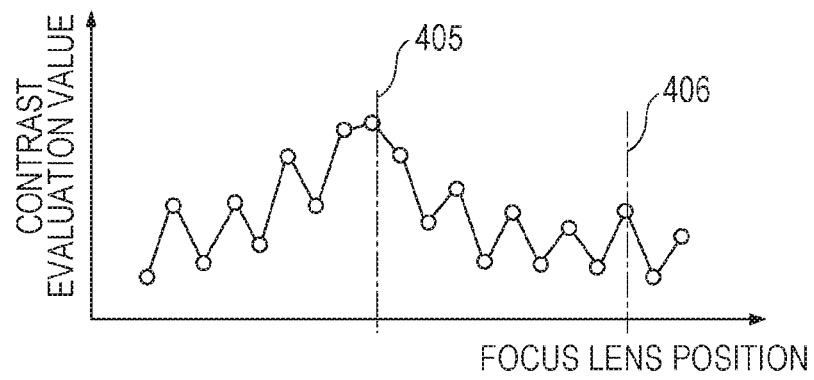

Next, FIG. 4C illustrates a relationship between a focus lens position and a contrast evaluation value in a case where the coarse scan is performed on a blinking object of a frequency higher than a predetermined value. Since the brightness and darkness of the luminance value of the blinking object varies periodically, which also affects the contrast evaluation value, the graph illustrated in FIG. 4C is acquired. As illustrated in FIG. 4C, when the object is blinking at a high frequency, there are many relative maximums. Therefore, a position such as numeral sign 406 that is different from the peak point 405 to be originally detected is erroneously determined to be a peak, resulting in blurring focus. Although numeral sign 406 is smaller as the contrast evaluation value than numeral sign 405, in the present embodiment, an algorithm that prioritizes the relative maximum on the minimum-object-distance side is installed, so that numeral sign 406 on the minimum-object-distance side is determined as a peak. Therefore, in the present embodiment, a blinking detection is performed for each boundary of zones illustrated in FIG. 4B to detect blinking at an early stage, and the contrast evaluation value is subjected to a process for preventing the blinking, thereby reducing a frequency of blurring focus.

Figure 4D:
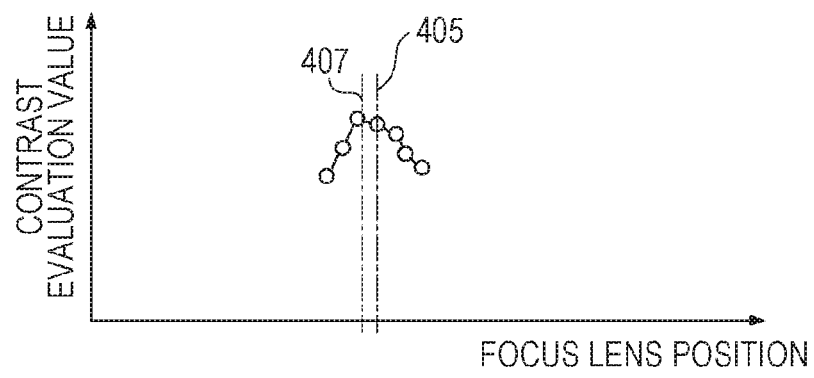

Next, FIG. 4D is a graph illustrating a relationship between a focus lens and a contrast evaluation value in a case where the fine scan is performed. In the fine scan, several scan points are set before and after around a peak point 405 calculated in the coarse scan. Then, by performing the scan at a depth smaller than a depth in the coarse scan (by narrowing the scan interval), a peak point 407 is calculated with high accuracy.

Processing Flow of Coarse Scan

Figure 5:
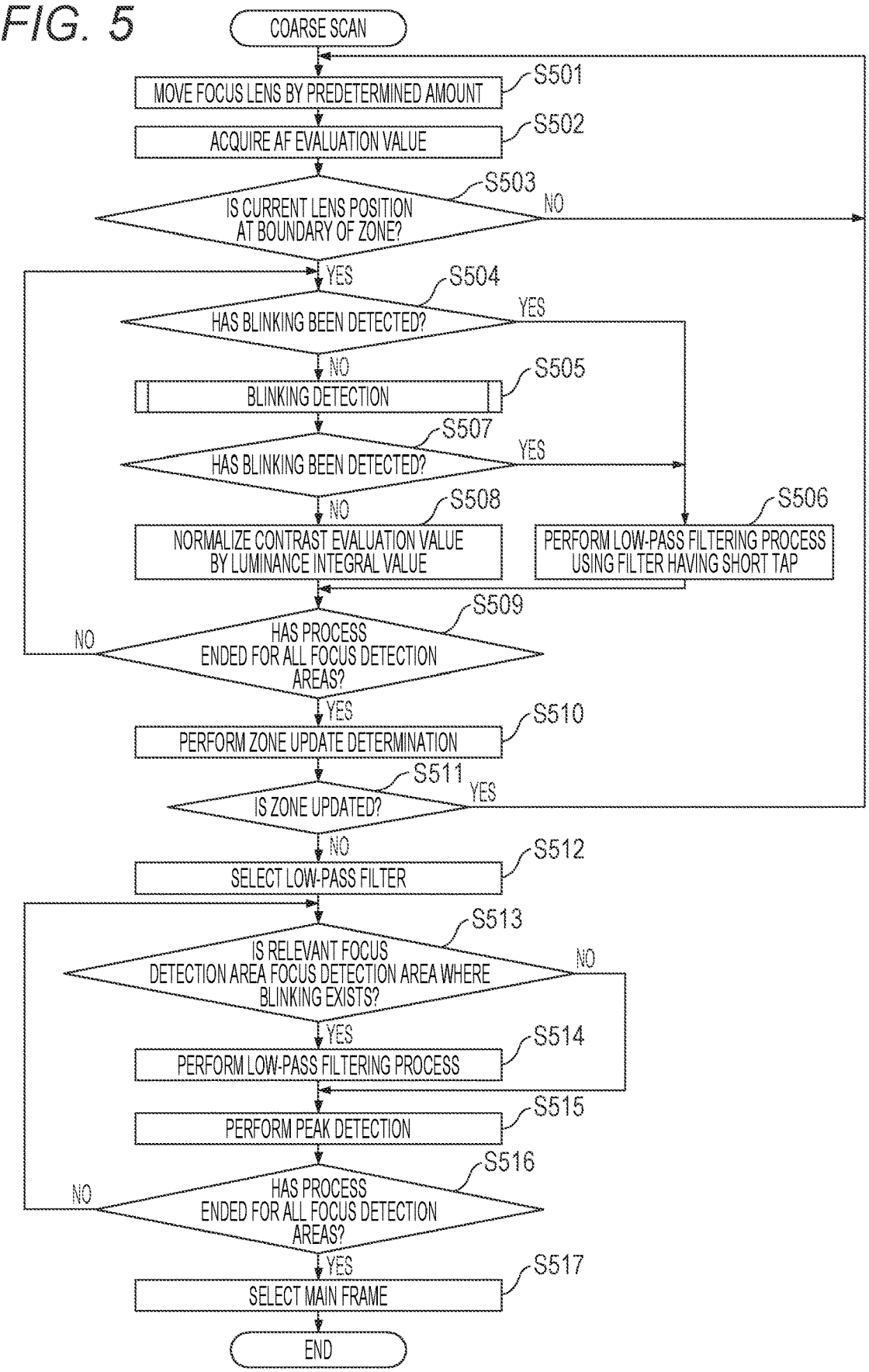
FIG. 5 is a flowchart illustrating a coarse scan process.

The coarse scan in S302 will be described with reference to the flowchart in FIG. 5.

First, in step S501, the focus lens is moved by the redetermined amount (by the scan interval).

Next, the process proceeds to S502, where the AF evaluation value is acquired. As described above, in the present embodiment, the focus detection area having a total of 35 frames in seven rows and five columns is set, and the evaluation value is acquired for each frame in S502. Additionally, in the present embodiment, the contrast evaluation value, the luminance integral value, and a maximum luminance value are acquired as the AF evaluation value.

Next, in S503, it is determined whether a current lens position is at a boundary of a zone. In a case where it is determined in S503 that the current lens position is at the boundary of the zone, the process proceeds to S504. Then, in a case where it is determined that the current lens position is not at the boundary of the zone, the process returns to S501, where the focus lens is moved again by the predetermined amount.

In step S504, in a relevant focus detection area, it is determined whether blinking has been detected at a boundary of another zone until a current zone is reached. By determining whether the blinking has been detected in S504, it is possible to avoid performing a process calculation of the blinking detection uselessly and to reduce the processing time of AF. Since the number of times of the blinking detections increases according to the number of AF frames and the number of zones, this determination is very effective for shortening the processing time.

In a case where blinking has not been detected yet, the process proceeds to S505, where the blinking detection is performed. The details of the blinking detection will be described later. In a case where blinking has been detected in S504, the process proceeds to S506, and a low-pass filtering process is performed. This low-pass filter process is an important process in the present embodiment. In a case where blinking has been detected, a low-pass filter is applied to the contrast evaluation value in a time axis direction, so that a high-frequency component can be excluded from the contrast evaluation value that varies as illustrated in FIG. 4C, and a peak point to be originally detected can be detected. Incidentally, as the low-pass filter used here, a filter having a tap length shorter than a predetermined tap length is used. The reason for using the filter having a short tap is to respond to a small number of scan samples.

In a case where blinking has been detected in S505, the process proceeds from S507 to S506, where the low-pass filtering process is performed in a manner similar to that of the process described above. In a case where no blinking has been detected in step S505, the process proceeds from step S507 to step S508, where the contrast evaluation value is normalized by the luminance integral value in the focus detection area.

In the blinking detection according to the present embodiment, blinking at a frequency higher than a predetermined value can be detected. However, for an object, the blinking of which cannot be detected in the blinking detection according to the present embodiment, variations in the contrast evaluation value are suppressed by the normalization using the luminance integral value in S508. After the process has passed through S506 or S508 and then the process of the contrast evaluation value has ended, the process proceeds to S509, where it is determined whether the blinking detection and a signal process have ended for all the focus detection areas. In a case where there is a focus detection area that has not been processed yet, the process returns to S504 again.

When the process for all the focus detection areas ends, the process proceeds to S510, where a zone update determination is performed. In the zone update determination, it is determined whether to proceed to the next zone to continue the scan or to end the scan in the current zone. In this zone update determination, the determination is made on the basis of a change in the contrast evaluation value at the boundary of the zone. In a case where the contrast evaluation value has stopped climbing and there is a possibility that the relative maximum exists beyond that point, the zone is updated to the next zone. Meanwhile, in a case where the peak has already been detected and the contrast evaluation value has decreased at the boundary of the zone, the scan ends in the current zone and it is determined that the zone is not updated. In a case where the zone is updated, the process returns from S511 to S501 and starts the scan again.

In a case where the zone is not updated, the process proceeds from S511 to S512, where the process proceeds to the selection of a low-pass filter for the final peak detection of the contrast evaluation value.

In the selection of the low-pass filter in S512, a filter to be used is determined according to the number of scan points. In a case where the number of scan points is equal to or greater than a predetermined number, a low-pass filter having a tap having a length longer than a predetermined length is used, and a high-frequency component is removed highly accurately. Meanwhile, in a case where the number of scan points is smaller than the predetermined value, a low-pass filter having a tap having a length shorter than the predetermined length is used. The reason is that if the low-pass filter having a long tap is used in a case where the number of scan points is small, the number of samples for performing a peak detection decreases, and conversely, the accuracy of the peak decreases.

After the low-pass filter is selected, it is decided in step S513 whether blinking has been detected in the relevant focus detection area. In a case where blinking has been detected, the process proceeds to step S514. In a case where blinking has not been detected, the process proceeds to step S515.

In S514, the low-pass filtering process is performed again on the contrast evaluation value. Here, in the low-pass filtering process in S514, the process is performed not for signals output from S506 and S508, but for the contrast evaluation value in the AF evaluation values acquired in S502. The reason is that if the process passes through S506 and also passes through S514, the low-pass filter is applied doubly, and the peak component of the contrast evaluation value to be extracted may disappear. After the low-pass filter, the process proceeds to S515, where the peak detection is performed. In the peak detection according to the present embodiment, the relative maximum near the focus lens position at which the slope and level of the peak are sufficient and focus is achieved on the minimum-object-distance side close to the imaging apparatus is selected.

Next, the process proceeds to S516, where it is determined whether the process has been performed for all the focus detection areas. In a case where there is an unprocessed focus detection area, the process returns to S513, where the low-pass filtering process is performed. In a case where it is determined in S516 that the process has been performed for all the focus detection areas, a main frame is selected from all the focus detection areas in S517. As the main frame, a focus detection area in which a peak closest to the minimum-object-distance side has been calculated is basically selected in the same manner as the peak detection.

Incidentally, in the blinking detection of the present embodiment, the blinking can be detected in a case where the luminance integral value of substantially each frame increases or decreases. For this reason, it is difficult to detect blinking, for example, for an object that blinks at a short period such that the luminance integral value increases and decreases once every five frames. Therefore, in the present embodiment, it is determined whether the maximum luminance value has changed by a predetermined value or more for each focus detection area separately from the blinking detection. By monitoring the change in the maximum luminance value over the entire scan area within the movable range of the focus lens is monitored, whereby it is possible to detect the blinking at a low period such that the luminance integral value increases or decreases once every five frames described above. The focus detection area in which the blinking at the short period has been detected in this determination is excluded from candidates for main frame selection, thereby preventing false focusing on a blinking object blinking of a low frequency. This result of the main frame is passed to S304 or S305 to execute the next process.

Processing Flow of Fine Scan

Figure 6:
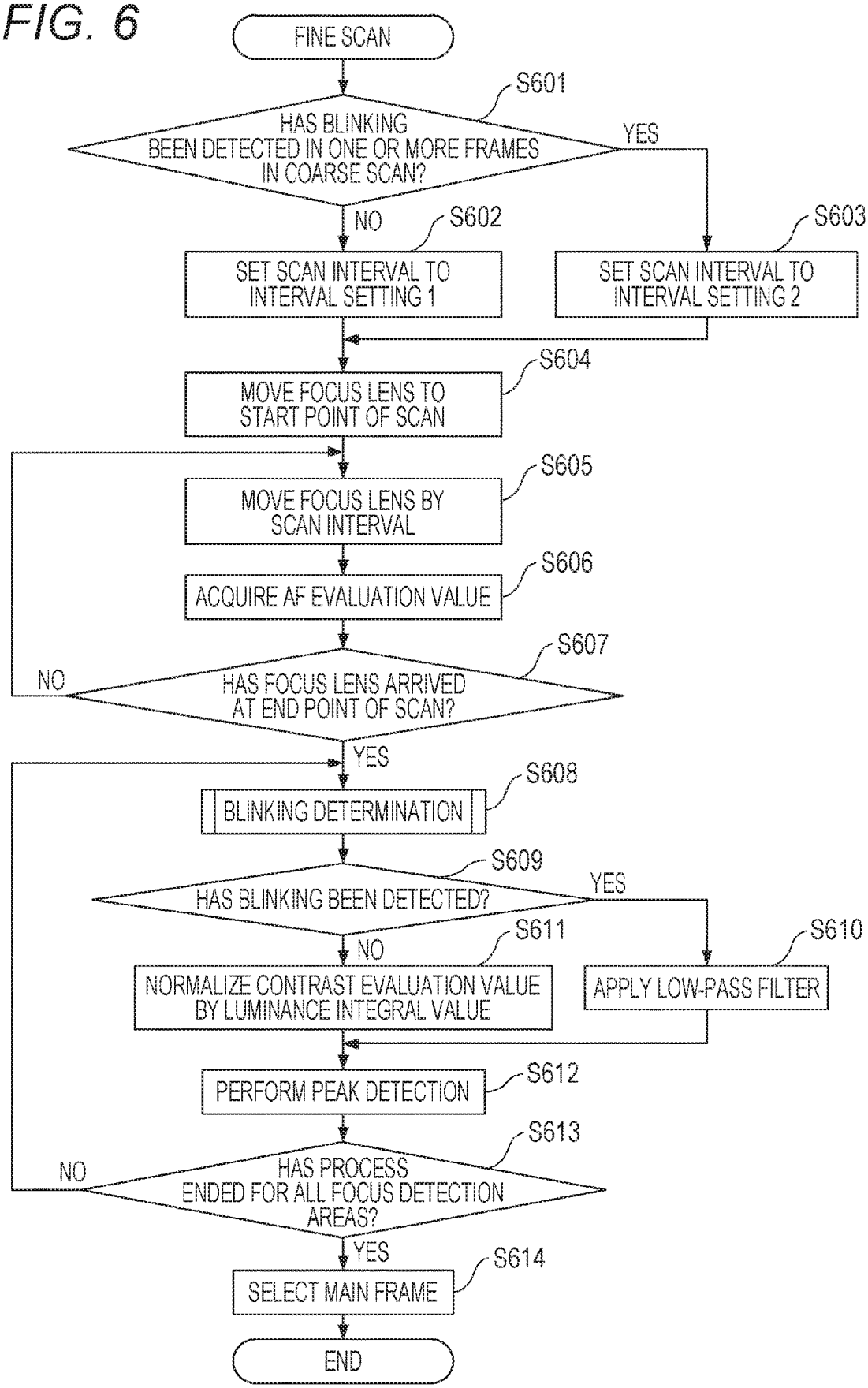
FIG. 6 is a flowchart illustrating a fine scan process.

A processing flow of the fine scan in S305 will be described with reference to the flowchart of FIG. 6.

First, in S601, it is determined whether blinking at a high frequency is detected in one or more focus detection areas in the coarse scan. In a case where blinking is not detected, the process proceeds to S602, where the interval of the focus lens position to be scanned is set to an interval setting 1. In a case where blinking is detected, the process proceeds to S603, where the interval of the focus lens position to scan is set to an interval setting 2. A relationship between the interval settings is set in advance so that the interval setting 2 is wider than the interval setting 1. The reason for widening the scan interval of the fine scan in a case where blinking is detected will be described later.

Next, the process proceeds to step S604, where the focus lens is moved to a scan start point. The start point is set on the basis of the peak point calculated in the coarse scan, the number of fine scans, and the scan interval. Basically, in the fine scan, a re-scan operation is performed on near the peak calculated in the coarse scan, and thus the start point is set at a position shifted from the peak in the coarse scan by half of the total number of fine scan points.

Next, the process proceeds to step S605, where the focus lens is moved by the scan interval. Then, in S606, an AF evaluation value is acquired.

In S607, it is determined whether the focus lens has reached a scan end point, and in a case where the focus lens has not reached the scan end point yet, the process returns to S605, where the focus lens is moved again. In a case where it is determined in step S607 that the focus lens has reached the scan end point, the process proceeds to step S608, where the blinking detection is performed.

Next, the process proceeds to S609. In a case where blinking has been detected, the process proceeds to S610. In a case where blinking has not been detected, the process proceeds to S611. In S610, the low-pass filter is applied to the contrast evaluation value in the time axis direction. In S611, the contrast evaluation value is normalized by the luminance integral value of the focus detection area. The description of each process is similar to that of the process in the coarse scan described above, and thus the description thereof will be omitted.

Next, the process proceeds to S612, where a peak detection process of the contrast evaluation value is performed. Then, the process proceeds to S613, where it is determined whether the process of all the focus detection areas has ended. In a case where there is an unprocessed focus detection area, the process returns to S609, where the blinking detection on the next focus detection area is performed. In a case where it is determined in S613 that the process has ended for all the focus detection areas, the process proceeds to S614, where a main frame is selected. A method of selecting the main frame is similar to that of the coarse scan, and thus the description thereof will be omitted. The above is the processing flow of the fine scan.

Reason for Widening the Scan Interval in a Case where Blinking is Detected

Here, regarding the scan interval of the fine scan, the reason why the scan interval of the above-described fine scan is widened in a case where blinking is detected will be described with reference to FIGS. 7A to 7D.

Figure 7A:
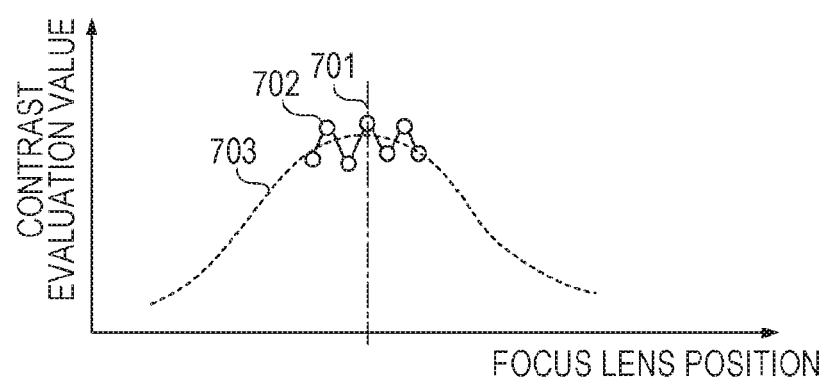
FIGS. 7A to 7D are graphs illustrating a relationship between a focus lens and a contrast evaluation value when a scan interval is changed in a fine scan.

FIG. 7A is a graph illustrating the relationship between the focus lens position and the contrast evaluation value in a case where the fine scan is performed on the blinking object at the interval setting 1. Broken line 701 is a line in which the peak point calculated in the coarse scan, reference sign 702 is an evaluation value acquired in the fine scan, and broken line 703 is a line in which the contrast evaluation value in a case where the same object is not blinking is continuously drawn.

Figure 7B:
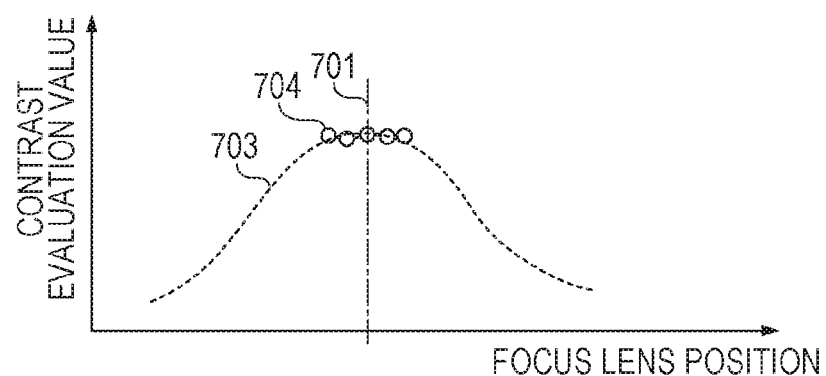

Then, 704 in FIG. 7B is an evaluation value acquired by performing the low-pass filtering process on 703 in FIG. 7A. In the fine scan, in a case where the object is not blinking, focusing accuracy can be improved by finely scanning the neighborhood of the peak of the coarse scan.

However, when the low-pass filter is applied, the slope of the peak becomes gentle and the evaluation value decreases, so that scanning at a narrow interval such as the interval setting 1 causes the slope to be almost flat. For this reason, the peak detection becomes difficult, resulting in being blurring focus or not in focus. Therefore, in the present embodiment, the interval setting 2 that is a scan interval wider than the interval setting 1 is used at the time of the blinking detection.

Figure 7C:
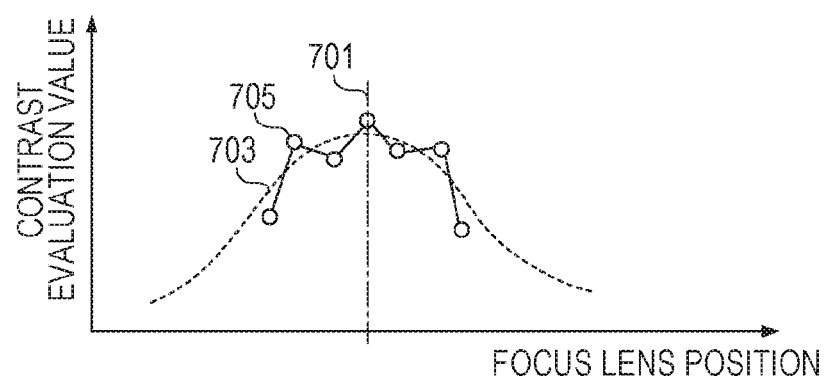
Figure 7D:
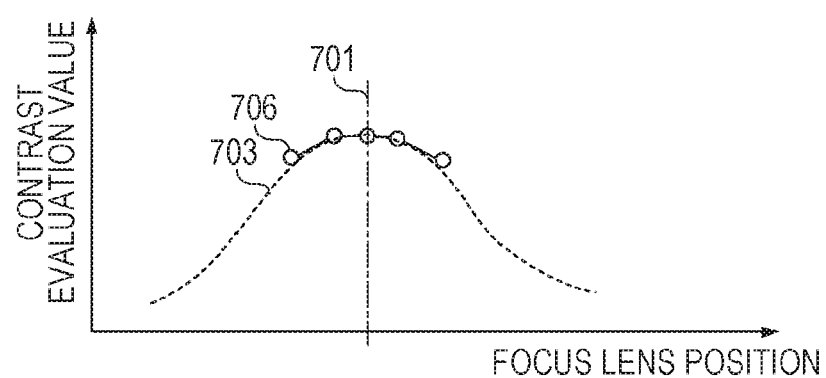

Reference sign 705 in FIG. 7C represents a result of the fine scan for the blinking object in a case where the interval setting 2 is used. The interval between scan points is wider than that in FIG. 7A. Reference sign 706 in FIG. 7D is a result of applying the low-pass filter to the contrast evaluation value of FIG. 7C. It can be seen that a peak shape is clearer than that in FIG. 7B because a mountain-shaped curve is not collapsed. The above is the reason for switching the interval setting.

Method of Blinking Detection

Next, a method of the blinking detection will be described with reference to FIGS. 8 and 9.

Figure 8A:
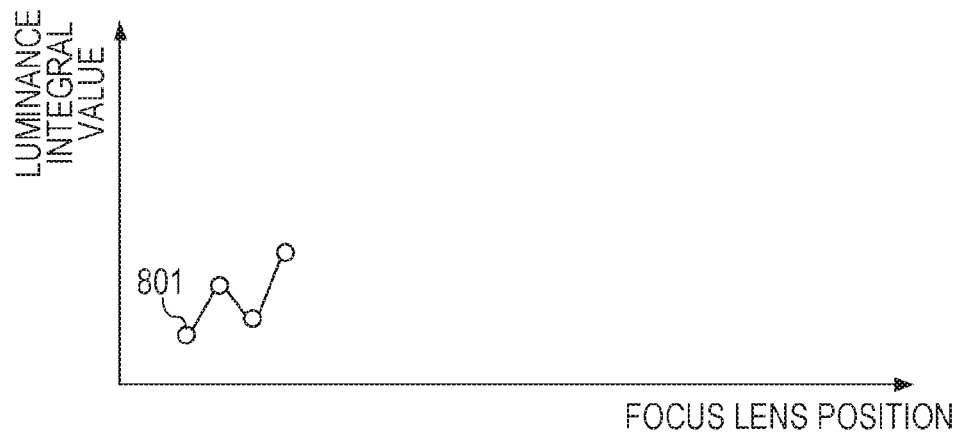
FIGS. 8A to 8C are graphs illustrating a processing method of a blinking detection.
Figure 8B:
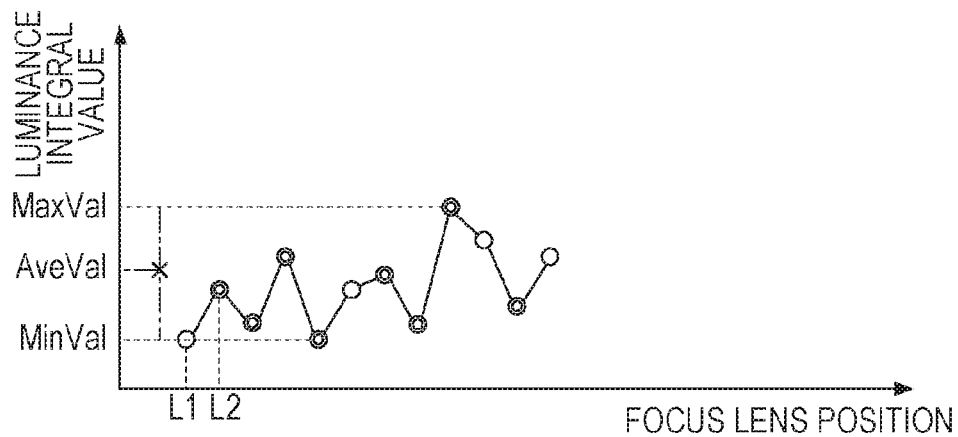
Figure 8C:
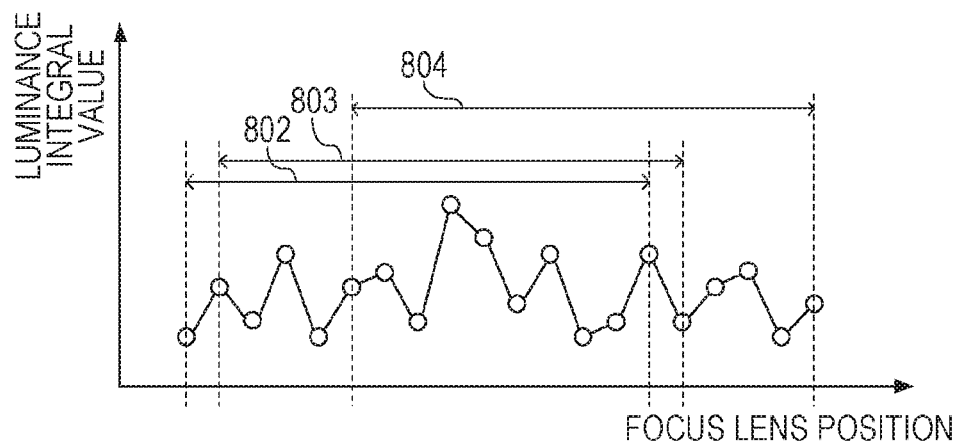

A process of the blinking detection in the present embodiment is changed according to the number of scan samples (nScanSample). FIGS. 8A to 8C are graphs for describing different processes according to nScanSample, and FIG. 9 is a processing flow of the blinking detection. First, an outline of the blinking detection will be described with reference to FIGS. 8A to 8C.

As described above, the process of the blinking detection is changed according to nScanSample. FIGS. 8A, 8B, and 8C are graphs illustrating the processes according to nScanSample. In each graph, a horizontal axis represents the focus lens position, a vertical axis represents the luminance integral value in the focus detection area, and 801 represents the luminance integral value with respect to the focus lens position when scanning. FIG. 8A illustrates a case where nScanSample is equal to or less than SCAN_TH1. In the present embodiment, SCAN_TH1 is set to five points. When nScanSamples is five points or less, the number of samples for the blinking detection is small and the accuracy of the blinking detection is low, so that a calculation process of the blinking detection is not performed. FIG. 8A illustrates a state in which the blinking detection is not performed because nScanSample is four points.

Next, FIG. 8B is a graph illustrating a case where nScanSample is larger than SCAN_TH1 and is equal to or less than SCAN_TH2. In the present embodiment, SCAN_TH2 is set to 15 points. In the blinking detection in the present embodiment, the blinking detection is performed using a change in the luminance integral value (luminance difference) between each frame and the number of extreme values of the luminance integral value. The change in the luminance integral value is calculated by Expression (1) at focus lens positions L1 and L2 in FIG. 8B. Note that Val indicates a luminance integral value at the focus lens position illustrated in parentheses.

$$|Val(L1)-Val(L2)| \qquad \text{Expression (1)}$$

Similar to Expression (1), a change in a luminance integral value of an adjacent focus lens position is calculated until the last sample, and after the luminance integral value of the adjacent focus lens position is calculated for all the samples, the sum of respective change amounts is divided by the number of times of calculations to normalize. In other words, the luminance difference in a predetermined moving range is normalized using the number of scan points. In the case of the scene of FIG. 8B, the change in the luminance integral value is calculated 11 times for 12 samples, so that the total value of the changes of 11 luminance integral values is divided by 11. A range for which the difference between the luminance integral values is calculated and a range for which the extreme values of the luminance integral values is calculated are changed according to nScanSample. In FIG. 8B, the change in the luminance integral value is normalized with respect to the entire scanned area, and the number of extreme values is counted. For each evaluation value calculated here, a threshold value determination is performed on a threshold value calculated as follows. The threshold value of the change in the luminance integral value is set according to an area of the focus detection area and an absolute value of the luminance integral value. For the former, since the luminance integral value changes in proportion to the area of the focus detection area and the change in the luminance integral value changes accordingly, the threshold value of the change in the luminance integral value also is to be changed similarly. For the latter, if the luminance of the object increases, the signal level when the bright and dark of blinking increases, and accordingly, a range of increases and decreases of the blinking object (the change in the luminance integral value) becomes large. Therefore, the threshold value of the change in the luminance integral value is changed according to the absolute value of a luminance signal. Note that the absolute value of the luminance integral value in the present embodiment is defined by an average value AveVal of a maximum value MaxVal of the luminance integral value and a minimum value MinVal of the luminance integral value. The threshold value of the number of extreme values that is another index of the blinking detection is set according to nScanSample. In the present embodiment, the threshold value of the number of extreme values is set to 50% of nScanSample. In an example in FIG. 8B, the threshold value of the number of extreme values is 6 because nScanSample is 12 points. Since the extreme values are a total of eight points expressed by a double circle plot, it is determined that a threshold value condition is satisfied. In a case where the change in the luminance integral value exceeds the threshold value and the number of extreme values exceeds the threshold value, it is determined that blinking has been detected.

Finally, FIG. 8C will be described. FIG. 8C is an example of a graph illustrating a case where nScanSample is larger than SCAN_TH2 and an example when 20 points are scanned. A basic calculation process is similar to that in FIG. 8B, but in FIG. 8C, a range in which the change in the luminance integral value is calculated and a range in which the extreme value of the luminance integral value is counted are changed. In the present embodiment, the upper limit of the number of scan points for calculating each evaluation value is set to 15 points. First, the change in the luminance integral value and the number of extreme values are counted from 15 points in the range of 802. Next, the change in the luminance integral value and the number of extreme values are calculated a plurality of times while shifting by a fixed amount (one point in FIG. 8C) in the range of 803, and finally the evaluation value is calculated in the range of 804. It is determined whether the number of extreme values exceeds the threshold value in each range, and after calculating the evaluation value in all ranges, the blinking detection is performed on the basis of a result of the range in which the change in the luminance integral value is the largest among the ranges where an extreme value number is equal to or greater than the threshold value. Blinking may not be detected properly depending on the position of the focus lens position, that is, an out-of-focus amount of the object. However, by calculating the evaluation values in a plurality of ranges in this way, it is possible to determine blinking with high accuracy.

Processing Flow of Blinking Detection

The processing flow of the blinking detection will be described with reference to the flowchart of FIG. 9.

First, the process proceeds to S901, where it is determined whether nScanSample is larger than SCAN_TH1. In a case where nScanSample is equal to or less than SCAN_TH1, the number of scan samples is small and it is difficult to perform the blinking detection with high accuracy. Therefore, the process proceeds to S902 without the blinking detection performed and ends as no blinking detected. In a case where nScanSample is larger than SCAN_TH1, the process proceeds to S903. In S903, it is determined whether nScanSample is larger than SCAN_TH2. In a case where nScanSample is equal to or less than SCAN_TH2, the process proceeds to S904, where nScanSample is substituted into nJudgeSample. nJudgeSample represents the number of samples used in one operation. In a case where nScanSample is larger than SCAN_TH2, the process proceeds to S905, where a numerical value of SCAN_TH2 is substituted into nJudgeSample. Thus, the upper limit of the number of samples that are used to perform the calculation of the blinking detection by substituting SCAN_TH2 into nJudgeSample is set to SCAN_TH2. Next, the process proceeds to S906, where a threshold value DIFF_TH of the change in the luminance integral value and a threshold value EXT_TH of the number of extreme values of the luminance integral value are calculated. The method for the calculation has already been described with reference to FIGS. 8A to 8C, and thus the description thereof is omitted. Next, the process proceeds to S907, where a calculation range for the blinking detection is set. The calculation range is managed by an index k. When the calculation range is shifted so as to shift from 802 to 803 in FIG. 8C, the index k is incremented by one. In a case where nScanSample is equal to or less than SCAN_TH2, the calculation range is the total number of scan points. In a case where nScanSample is larger than SCAN_TH2, the calculation range is shifted by one point as described with reference to FIG. 8C. Next, the process proceeds to S908, where the number of extreme values of the luminance integral value is counted in the range set in S907. Then, in S909, it is determined whether the number of extreme values of the luminance integral value is larger than EXT_TH. In a case where the number of extreme values of the luminance integral value is equal to or less than EXT_TH, the process proceeds to S910, where the extreme value number FLAG [k] is set to FALSE. In a case where the extreme value number is larger than EXT_TH, the process proceeds to S911, where an extreme value number FLAG [k] is set to TRUE. Next, the process proceeds to S912, where a change in the luminance integral value is calculated, and is normalized by the number of times of calculations. Then, in S913, the change in the luminance integral value calculated in S912 is normalized by the area of the focus detection area. Next, the process proceeds to S914, where it is determined whether the calculation of the evaluation value for the blinking detection has ended for the entire scan area. In a case where the calculation for the entire scan area has not ended, the process returns to S907, where the next calculation range is set. In a case where it is determined that the calculation has ended for the entire scan area, the process proceeds from S914 to S915. In S915, the maximum value among changes in the luminance integral value calculated in the calculation range in which the extreme value number FLAG is TRUE is acquired. Next, the process proceeds to S916, where the maximum value of the change in the luminance integral value acquired in S915 is compared with DIFF_TH. In a case where the maximum value is equal to or less than DIFF_TH, the process proceeds to S902, it is determined as no blinking detected and the blinking detection ends. In a case where it is determined in S916 that the maximum value is larger than DIFF_TH, the process proceeds to S917, where it is determined that blinking has been detected in the relevant focus detection area, and the blinking detection ends.

Note that in the flowchart of FIG. 9, the threshold value is an one-stage threshold value to determine the presence or absence of blinking. However, the threshold value may be a two-stage threshold value to calculate the reliability of the blinking detection. Then, in a case where the reliability is high, the contrast evaluation value may be applied by the low-pass filter. In a case where the reliability is not sufficient, the threshold value for the peak detection of the contrast evaluation value may be set a strict value to prevent false focusing. The above is the processing flow of the blinking detection.

According to the present embodiment, it is possible to highly accurately focus on the object having a luminance change.

In each of the embodiments described above, a case where the disclosure has been applied to a digital camera has been described as an example, but the disclosure is not limited to this example. That is, the disclosure may be applied to any device with an imaging element. That is, the disclosure is applicable to any device capable of capturing an image, such as a mobile phone terminal, a portable image viewer, a television having a camera, a digital photo frame, a music player, a game machine, and an electronic book reader.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-068847, filed Mar. 29, 2019, which is hereby incorporated by reference herein in its entirety.

What is claimed is:

1. An apparatus that performs a scan operation of acquiring a focus signal, and acquires a focus position of a focus lens based on the focus signal, the apparatus comprising:
a memory device that stores a set of instructions; and
at least one processor that executes the set of instructions to function as:
a first determination unit configured to determine whether an object is blinking at a predetermined period, and
a first signal processing unit configured to perform a filtering process on the acquired focus signal in a case where the object is blinking at the predetermined period,
wherein, in the scan operation, the apparatus sequentially acquires a plurality of the focus signals,
wherein each of the plurality of the focus signals is acquired based on a corresponding signal among a plurality of signals, each of the plurality of signals being output for each frame,
wherein the first signal processing unit performs the filtering process on the plurality of the focus signals in a time axis direction, and
wherein in a case where a number of scan points in the scan operation is smaller than a first threshold value, a process of a blinking detection is not performed.

2. The apparatus according to claim 1, wherein the at least one processor is configured to further function as:
a second signal processing unit configured to normalize the acquired focus signal based on a luminance value in a case where the object is not blinking at the predetermined period.

3. The apparatus according to claim 2, wherein the at least one processor is configured to further function as:
a first acquisition unit configured to acquire a luminance integral value of a focus detection area;
a first calculation unit configured to calculate a difference between luminance integral values of focus lens positions adjacent to each other at a scan point in the scan operation;
a normalization unit configured to normalize a luminance difference in a predetermined moving range, using a number of scan points; and
a count unit configured to count a number of extreme values of a change in the luminance integral value in the predetermined moving range,
wherein in a case where both a condition that the number of extreme values is equal to or greater than a predetermined number and a condition that the normalized value exceeds a threshold value are fulfilled, the first determination unit determines that a blinking object exists, and in a case where either of the condition is not fulfilled, the first determination unit determines that the blinking object does not exist.

4. The apparatus according to claim 1,
wherein the at least one processor is configured to further function as a normalization unit; and
wherein in a case where the number of scan points in the scan operation is equal to or greater than a first threshold value and smaller than a second threshold value, the first determination unit performs a process by the normalization unit and a process by a count unit, with respect to a range of the focus lens where the scan operation has been performed, and performs the blinking detection, and
in a case where the number of scan points is equal to or greater than the second threshold value, the first determination unit performs the process by the normalization unit and the process by the count unit a plurality of times while shifting the process by the normalization unit and the process by the count unit, respectively by a fixed amount, with respect to a predetermined moving range, and performs the blinking detection, using a normalized value that is maximum in a moving range in which a number of extreme values is equal or greater than a predetermined number.

5. The apparatus according to claim 3, wherein the normalization unit is configured to perform a normalization by an area of a focus detection area.

6. The apparatus according to claim 4, wherein the at least one processor is configured to further function as:
a second acquisition unit configured to acquire a maximum value of luminance and a minimum value of luminance in the moving range for calculating a value normalized by the normalization unit; and
a second calculation unit configured to calculate an average value of the acquired maximum value of luminance and the acquired minimum value of luminance,
wherein a threshold value of the normalized value is set based on an area of a focus detection area and an average value of the luminance of the focus detection area.

7. The apparatus according to claim 3, wherein the predetermined number is set based on the number of scan points at which the number of extreme values is counted.

8. The apparatus according to claim 1, wherein the at least one processor is configured to further function as:
a detection unit configured to detect a peak of the acquired focus signal; and
a second determination unit configured to determine reliability of the detected peak based on a level of the detected peak and a slope of the detected peak,
wherein in a case where the reliability of the detected peak is lower than a predetermined value, when a re-scan operation is performed around the peak and the first determination unit determines that the object is blinking at the predetermined period, a scan interval of the re-scan operation is widened as compared with a case where the object is not blinking at the predetermined period.

9. The apparatus according to claim 1, wherein in a case where the first determination unit determines that the object is blinking at the predetermined period, the number of scan points of a re-scan operation is increased as compared with a case where the first determination unit determines that the object is not blinking at the predetermined period.

10. The apparatus according to claim 1, wherein in a case where the number of scan points is equal to or greater than a predetermined number, a filter having a longer tap length than a filter used in a case where the number of scan points is smaller than the predetermined number is used.

11. The apparatus according to claim 1, wherein the at least one processor is configured to further function as:
a decision unit configured to set a threshold value used by the first determination unit in a plurality of stages, and decide reliability of a blinking detection,
wherein in a case where the reliability of the blinking detection is the highest, the filtering process is performed, and in a case where the reliability of the blinking detection is not the highest, a threshold value of a peak detection is set to a strict value as compared with a case where the reliability of the blinking detection is the highest.

12. The apparatus according to claim 1, wherein the at least one processor is configured to further function as:
a dividing unit configured to divide a moving range of the focus lens into a plurality of ranges,
wherein the first determination unit performs the blinking detection each time the scan operation is performed to reach a boundary of the moving range.

13. The apparatus according to claim 12, wherein in a case where the object is blinking at the predetermined period in the moving range where the scan operation has already been performed among the plurality of divided moving ranges, the filtering process is performed without the blinking detection being performed.

14. The apparatus according to claim 1, wherein the at least one processor is configured to further function as:
a setting unit configured to set a plurality of focus detection areas,
wherein the first determination unit performs the blinking detection on each focus detection area.

15. The apparatus according to claim 1, wherein the at least one processor is configured to further function as:
a selection unit configured to select a focus detection area from a plurality of focus detection areas; and
a monitoring unit configured to acquire a change in a maximum value of luminance of an image signal in the focus detection area,
wherein the selection unit selects the focus detection area in which the maximum luminance value has changed by a predetermined value or more.

16. An apparatus that moves a focus lens, performs a scan operation of sequentially acquiring a focus signal, and acquires a focus position of the focus lens based on the focus signal, the apparatus comprising:
a memory device that stores a set of instructions; and
at least one processor that executes the set of instructions to function as:
a first determination unit configured to determine whether an object is blinking at a predetermined period;
a detection unit configured to detect a peak of the acquired focus signal;
a second determination unit configured to determine reliability of the detected peak based on a level of the detected peak and a slope of the detected peak,
wherein in a case where the reliability of the detected peak is lower than a predetermined value, a scan interval in a case where the object is blinking at the predetermined period is widened as compared with a case where the object is not blinking at the predetermined period, and a re-scan operation is performed.

17. The apparatus according to claim 16, wherein in the case where the object is blinking, a number of scan points of the re-scan operation is increased as compared with the case where the object is not blinking.

18. The apparatus according to claim 16, wherein the at least one processor is configured to further function as:
a dividing unit configured to divide a moving range of the focus lens into a plurality of ranges,
wherein the first determination unit performs a determination each time the scan operation is performed to reach a boundary of the plurality of divided moving ranges.

19. The apparatus according to claim 18, wherein in a case where the object is blinking at a specific period in the moving range in which the scan operation has already been performed among the plurality of divided moving ranges, the first determination unit does not perform a blinking detection again.

20. The apparatus according to claim 16, wherein the at least one processor is configured to further function as:
  a setting unit configured to set a plurality of focus detection areas,
  wherein the first determination unit performs a blinking detection for each focus detection area.

21. A device comprising:
  a sensor; and
  the apparatus according to claim 1,
  wherein the apparatus acquires the focus signal based on output from the sensor.

22. A device comprising:
  a sensor; and
  the apparatus according to claim 16,
  wherein the apparatus acquires the focus signal based on output from the sensor.

23. A method of performing a scan operation of acquiring a focus signal, and acquiring a focus position of a focus lens based on the focus signal, the method comprising:
  determining whether an object is blinking at a predetermined period; and
  performing a filtering process for the acquired focus signal in a case where the object is blinking at the predetermined period,
  wherein, in the scan operation, a plurality of the focus signals is sequentially acquired,
  wherein each of the plurality of the focus signals is acquired based on a corresponding signal among a plurality of signals, each of the plurality of signals being output for each frame,
  wherein the filtering process is performed on the plurality of the focus signals in a time axis direction, and
  wherein in a case where a number of scan points in the scan operation is smaller than a first threshold value, a process of a blinking detection is not performed.

24. A method of moving a focus lens, performing a scan operation of sequentially acquiring a focus signal, and acquiring a focus position of the focus lens based on the focus signal, the method comprising:
  determining whether an object is blinking at a predetermined period;
  detecting a peak of the acquired focus signal; and
  determining reliability of the detected peak based on a level of the detected peak and a slope of the detected peak,
  wherein in a case where the reliability of the detected peak is lower than a predetermined value, a scan interval in a case where the object is blinking at the predetermined period is widened as compared with a case where the object is not blinking at the predetermined period, and a re-scan operation is performed.

* * * * *